US012229185B2

(12) United States Patent
Spahr et al.

(10) Patent No.: US 12,229,185 B2
(45) Date of Patent: Feb. 18, 2025

(54) CREATING, MAINTAINING, AND GROWING VIRTUAL MUSIC-THEMED WORLD

(71) Applicants: Sony Group Corporation, Tokyo (JP); Sony Music Entertainment, New York, NY (US)

(72) Inventors: Bradley Spahr, Redondo Beach, CA (US); Thomas Sachson, Malibu, CA (US)

(73) Assignees: SONY GROUP CORPORATION, Tokyo (JP); SONY MUSIC ENTERTAINMENT, New York, NY (US)

( * ) Notice: Subject to any disclaimer, the term of this patent is extended or adjusted under 35 U.S.C. 154(b) by 0 days.

(21) Appl. No.: 17/324,632

(22) Filed: May 19, 2021

(65) Prior Publication Data
US 2021/0365493 A1 Nov. 25, 2021

Related U.S. Application Data

(60) Provisional application No. 63/044,709, filed on Jun. 26, 2020, provisional application No. 63/027,794, filed on May 20, 2020.

(51) Int. Cl.
*G06F 16/00* (2019.01)
*G06F 16/635* (2019.01)
(Continued)

(52) U.S. Cl.
CPC ............ *G06F 16/635* (2019.01); *G06F 21/10* (2013.01); *G06F 16/2379* (2019.01);
(Continued)

(58) Field of Classification Search
CPC ............... G06F 16/635; G06F 16/2379; G06F 16/9535; G06F 21/10; G06F 2221/0713;
(Continued)

(56) References Cited

U.S. PATENT DOCUMENTS 3,744,803 A 7/1973 Bazzy
6,119,229 A 9/2000 Martinez
(Continued)

FOREIGN PATENT DOCUMENTS

CN 107852573 A 3/2018
EP 715243 A1 6/1996
(Continued)

OTHER PUBLICATIONS

C. Drews and F. Pestoni, "Virtual jukebox: reviving a classic," Proceedings of the 35th Annual Hawaii International Conference on System Sciences, 2002, pp. 887-893.
(Continued)

*Primary Examiner* — Irete F Ehichioya
*Assistant Examiner* — Shirley D Hicks
(74) *Attorney, Agent, or Firm* — Procopio, Cory, Hargreaves & Savitch LLP

(57) ABSTRACT

Adjusting virtual environment using recommendations, including: retrieving character information from a character database, where the character information is associated with a character associated with the virtual environment, and the character information includes character appearance information, character position information, and character action information; retrieving profile information from a profile database, where the profile information indicates one or more profile characteristics and at least one profile characteristic is related to music; comparing at least part of the character information with one or more of the profile characteristics to determine a comparison result; generating adjustment information based on the comparison result; sending the adjustment information to a client system through a network; receiving an adjustment reply from the client system through the network; and adjusting informa-
(Continued)

tion for the virtual environment based on the adjustment reply.

10 Claims, 5 Drawing Sheets

(51) Int. Cl.
*G06F 21/10* (2013.01)
*G06F 16/23* (2019.01)
*G06F 16/9535* (2019.01)
*G06Q 30/0207* (2023.01)
*H04L 67/01* (2022.01)

(52) U.S. Cl.
CPC ...... *G06F 16/9535* (2019.01); *G06F 21/1015* (2023.08); *G06F 21/1075* (2023.08); *G06F 2221/2141* (2013.01); *G06Q 30/0222* (2013.01); *H04L 67/01* (2022.05)

(58) Field of Classification Search
CPC ..... G06F 2221/0768; G06F 2221/2141; G06F 21/64; G06Q 30/0222; G10G 1/00; G10H 1/0025; G10H 2240/131; H04L 67/01; H04L 67/306
USPC .................................................. 707/600–899
See application file for complete search history.

(56) References Cited

U.S. PATENT DOCUMENTS

| | | | |
|---|---|---|---|
| 6,567,983 B1 | 5/2003 | Shiimori | |
| 7,031,943 B1 | 4/2006 | James et al. | |
| 8,060,825 B2 | 11/2011 | Chaudhri | |
| 10,628,392 B1 | 4/2020 | Charytoniuk et al. | |
| 11,565,184 B1 | 1/2023 | Linden | |
| 2001/0018667 A1 | 8/2001 | Kim | |
| 2001/0037316 A1 | 11/2001 | Shiloh | |
| 2002/0038221 A1 | 3/2002 | Tiwary et al. | |
| 2002/0180803 A1 | 12/2002 | Kaplan et al. | |
| 2002/0184515 A1 | 12/2002 | Oho et al. | |
| 2006/0143236 A1 | 6/2006 | Wu | |
| 2006/0195376 A1 | 8/2006 | Jung | |
| 2007/0106551 A1 | 5/2007 | McGucken | |
| 2007/0156697 A1 | 7/2007 | Tsarkova | |
| 2008/0046222 A1 | 2/2008 | Van Luchene | |
| 2008/0060084 A1 | 3/2008 | Gappa et al. | |
| 2008/0221998 A1* | 9/2008 | Mendelsohn | G06Q 30/0226 705/14.12 |
| 2008/0250315 A1* | 10/2008 | Eronen | G06F 16/68 715/767 |
| 2009/0054157 A1 | 2/2009 | Hamilton, II | |
| 2009/0099919 A1 | 4/2009 | Schultheiss | |
| 2009/0313556 A1 | 12/2009 | Hamilton, II | |
| 2010/0018382 A1 | 1/2010 | Feeney | |
| 2010/0125529 A1 | 5/2010 | Srinivasan | |
| 2010/0235292 A1 | 9/2010 | Jung | |
| 2011/0087552 A1 | 4/2011 | Carver | |
| 2011/0210962 A1 | 9/2011 | Horan | |
| 2012/0101886 A1 | 4/2012 | Subramanian et al. | |
| 2012/0231441 A1 | 9/2012 | Parthasarathy et al. | |
| 2012/0246584 A1 | 9/2012 | Beroukhim et al. | |
| 2013/0317936 A1 | 11/2013 | Hughes | |
| 2013/0333055 A1 | 12/2013 | Pallakoff | |
| 2014/0096263 A1 | 4/2014 | Mallardo | |
| 2014/0101778 A1 | 4/2014 | Davidson | |
| 2014/0119580 A1 | 5/2014 | Osada | |
| 2014/0171191 A1 | 6/2014 | Cox | |
| 2014/0229850 A1* | 8/2014 | Makofsky | A63F 13/79 715/747 |
| 2015/0098597 A1 | 4/2015 | Kulavik | |
| 2015/0205971 A1 | 7/2015 | Sanio et al. | |
| 2015/0278820 A1 | 10/2015 | Meadows | |
| 2015/0286276 A1* | 10/2015 | Harrell, Jr. | A63F 13/79 463/31 |
| 2015/0310497 A1 | 10/2015 | Valin et al. | |
| 2017/0180288 A1 | 6/2017 | Barbour et al. | |
| 2017/0200195 A1 | 7/2017 | Kugler | |
| 2019/0318060 A1 | 10/2019 | Brenner | |
| 2019/0318348 A1 | 10/2019 | Brenner | |
| 2020/0073482 A1 | 3/2020 | Levesque | |
| 2020/0073485 A1 | 3/2020 | Al-Halah et al. | |
| 2020/0143012 A1 | 5/2020 | Tardelli et al. | |
| 2020/0353362 A1 | 11/2020 | Sachson | |
| 2020/0106144 A1 | 12/2020 | Schmitt | |
| 2020/0406144 A1* | 12/2020 | Estanislao | A63F 13/67 |
| 2021/0321061 A1 | 10/2021 | Kawakami | |
| 2021/0321170 A1 | 10/2021 | MacDougall | |

FOREIGN PATENT DOCUMENTS

| | | |
|---|---|---|
| JP | 2007167383 A | 7/2007 |
| JP | 2009509193 A | 3/2009 |
| JP | 2010134908 A | 6/2010 |
| JP | 2014500545 A | 1/2014 |
| JP | 2022529028 A | 6/2022 |
| KR | 20080058367 A | 6/2008 |
| KR | 20100073549 A | 7/2010 |
| KR | 20140126152 A | 10/2014 |
| KR | 101885349 B1 | 8/2018 |
| WO | WO-2007031985 A2 | 3/2007 |
| WO | WO-2014006886 A1 | 1/2014 |
| WO | WO-2018235607 A1 | 12/2018 |
| WO | WO-2020061132 A1 | 3/2020 |

OTHER PUBLICATIONS

Grindley, P. (2018). Cross-Licensing. In: Augier, M., Teece, D.J. (eds) The Palgrave Encyclopedia of Strategic Management. Palgrave Macmillan, pp. 1-7, London.

K. Hill, "A perspective: the role of identifiers in managing and protecting intellectual property in the digital age," in Proceedings of the IEEE, vol. 87, No. 7, pp. 1228-1238, Jul. 1999.

M. Hopmann, D. Thalmann and F. Vexo, "Virtual Shelf: Sharing Music Between People and Devices," 2010 International Conference on Cyberworlds, 2010, pp. 53-59.

* cited by examiner

CREATING, MAINTAINING, AND GROWING VIRTUAL MUSIC-THEMED WORLD

CROSS-REFERENCE TO RELATED APPLICATIONS

This application claims the benefits of priority under 35 U.S.C. § 119(e) of U.S. Provisional Patent Application No. 63/027,794, filed May 20, 2020, entitled "Mix Tapes in Virtual Reality Environment" and U.S. Provisional Patent Application No. 63/044,709, filed Jun. 26, 2020, entitled "Virtual Content Management." The disclosures of the above-referenced applications are incorporated herein by reference.

BACKGROUND

Field

The present disclosure relates to music-themed virtual world, and more specifically, to creating, managing, growing, and participating in a music themed virtual world.

Background

Currently, managing music-themed virtual world is not clear. Thus, need exists for the management of virtual music-themed environment

SUMMARY

The present disclosure pertains to the creation of a proprietary, affordable, robust, secure, adaptable, scalable, and entertaining music themed world that may be accessed, consumed, manipulated, and shared on a variety of multimedia digital engagement platforms.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
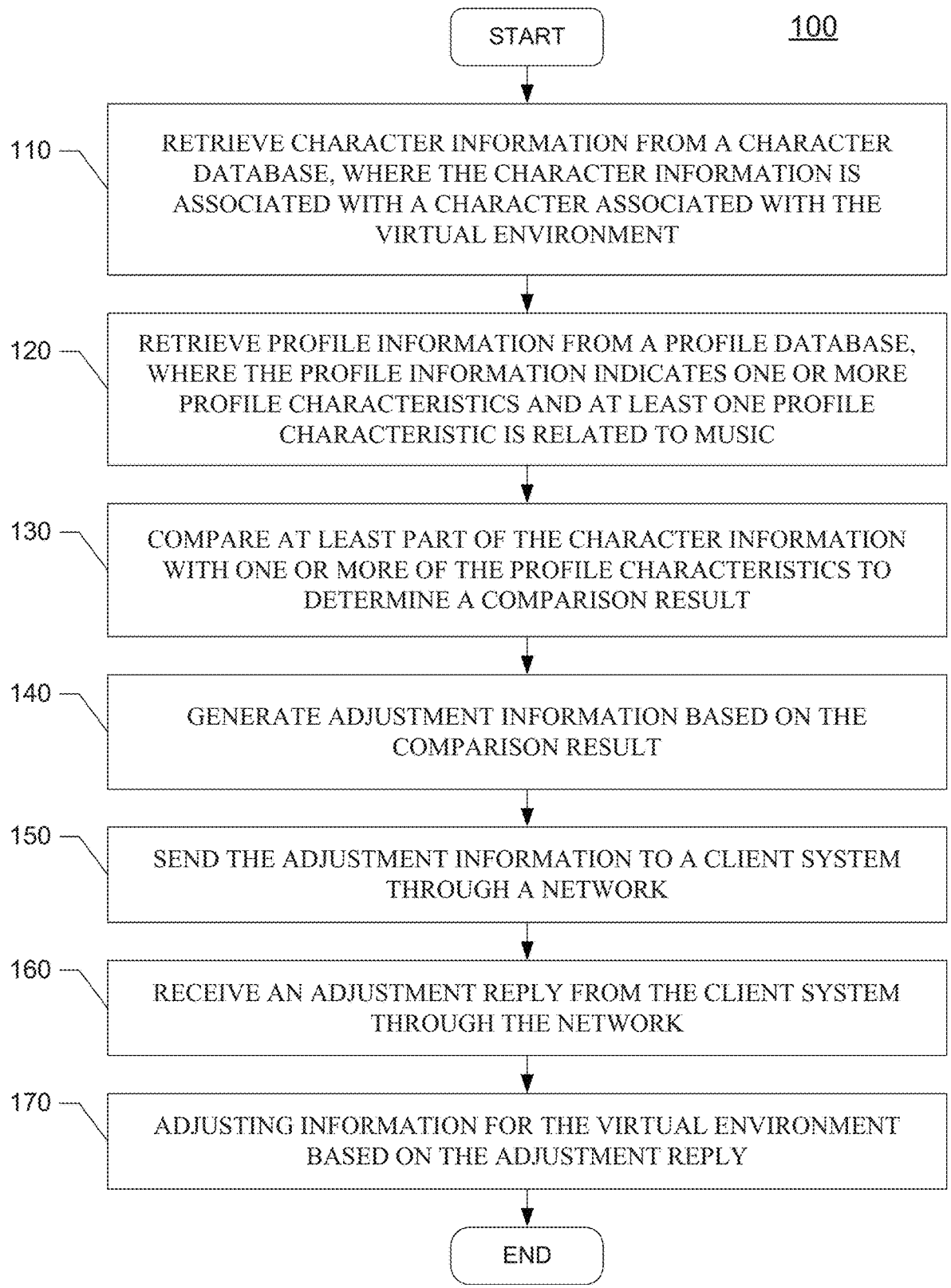
FIG. 1 is a flow diagram of a method for adjusting a virtual environment using recommendations in accordance with one implementation of the present disclosure.

The present disclosure pertains to the creation of a proprietary, affordable, robust, secure, adaptable, scalable, and entertaining music themed world that may be accessed, consumed, manipulated, and shared on a variety of multimedia digital engagement platforms. In one implementation, a computer system or platform provides a virtual environment, such as online or offline game or social environment combining one or more of images, video, audio, user interface, and text, or a virtual environment. In one such implementation, the platform includes one or more servers for data processing and management, and for communication with clients and users, and one or more databases, such as a character database storing information about characters in the virtual environment, a music database storing information about songs and music rights or virtual content rights, and a profile database storing information about profiles for recommending and selecting information or adjustments. In one implementation, a profile database stores information indicating music profile characteristics, such as music type, song, or artist, for selecting or recommending music, music types, or artists. In one implementation, a character database stores music information associated with a character and a user indicating music preferences for the user. In another implementation, the character database stores appearance information associated with a character indicating the appearance to present in the virtual environment. In one such implementation, the appearance and actions of a character, such as facial expression or movement, change based on the actions of other characters and the environment, such as music being played. maximum number of rights or songs that can be assigned to the character. In one implementation, an object database stores object music information indicating music to present to characters near the object. In one implementation, a music database stores music popularity information, and the platform uses the music popularity information to adjust aspects of the virtual environment. Additional implementations and aspects of implementations are described further below.

The computer system supporting this system can be centralized on a single computer, on an array of computers, be centrally housed, be distributed, and/or any combination thereof. The computer system can be used to provide instructions to music creators (human, artificial intelligence, or any combination thereof) on modifications to be made to the new and distinct piece of music under review by the present disclosure.

The computer system can be used to provide instructions to music creators (human, artificial intelligence, or any combination thereof) on the creation of new music.

The computer system can combine the analysis and results of multiple instances of pre-existing and new and distinct pieces of music and fundamental music segments extractions.

The computer system can be used to identify and advise on the types of musical attributes to be avoided in a given new and distinct piece of music under review by the present disclosure.

The computer system can be used to determine and/or confirm the possible ranges of new music popularity, the level of commercial appeal of new music, the level of synergy between the subject music and paired products, services, and advertisements, the price point or points at which the new music may be sold to different types of music listeners, and the therapeutic benefits likely to accrue to those listening to such new music.

The computer system can source a new and distinct piece of music for analysis through direct submission by the operator of the computer system.

The computer system can source a new and distinct piece of music for analysis by automatically crawling publicly available music pieces that are resident on third party systems (e.g., private databases or public Internet).

The computer system can support virtual concerts that enable artists to create a "volumetric" and/or "holographic" version of themselves and merge it with a virtual concert venue that they design from their imagination.

The computer system can support music listening rooms as a feature that customizes a virtual building and showcases songs and/or music videos, lyrics, videos, photography, and factoids in an immersive interactive experience.

The computer system can support artist ride experiences that take users on an immersive journey featuring one or more songs and/or music videos and simulating a traditional theme park ride.

Comprehensive personalization allowing users to customize their own music room, create virtual music-related digital assets (such as mix tapes and analogous music-related digital assets), and apply virtual clothing, hair styles, hats, etc. onto their avatar.

The computer system can support virtual music avatars/personalities engaging with users via artificial intelligence and delivering personalized narratives, quests, and other voice powered interactions.

The computer system can support storytelling & immersive podcasts that tell an interactive story using a specific playlist of songs and/or music videos, visuals, and voiceover narration.

The computer system can support customer collection, engagement, retention, and reward mechanisms that are effective in a physical amusement park setting as imported into a virtual environment world setting.

The computer system can support design of the system to enable porting to various head mount display ("HMD") systems, such as PC-tethered HMDs, game console-tethered HMDs, all-in-one mobile HMDs (e.g., Wi-Fi or cellular wireless connectivity HMDs), mobile phone "slide in" HMDs, or otherwise.

The computer system can support the creation of community events at scheduled times throughout the day (e.g., every hour the EDM city goes into a light show like the way Hong Kong does every night).

Advertising Related Aspects

The computer system can support numerous functions related to the engagement of users and advertisers, with such engagements accruing benefits to one or more of the platforms, the users, third-parties, and the advertisers. In this regard, the following are contemplated:

The computer system to support virtual billboards where users may engage with ad and get reward (virtual currency, content, or music-related digital assets). The rewards to range from free or discount coupons; and may be for in-world or outside-world assets.

The computer system to support virtual brand sponsored areas where users may engage with any activity within a brand sponsored area and get reward (virtual currency, content, or music-related digital assets). The rewards to range from free or discount coupons; and may be for in-world or outside-world assets.

The computer system to support virtual concerts where users engage with brand sponsored concerts and get reward (virtual currency, content, or music-related digital assets). The rewards to range from free or discount coupons; and may be for in-world or outside-world assets.

The computer system to support virtual mini-games where users engage with brand sponsored game and get reward (virtual currency, content, or music-related digital assets). The rewards to range from free or discount coupons; and may be for in-world or outside-world assets.

The computer system to support virtual mini-rides where users engage with brand sponsored game and get reward (virtual currency, content, or music-related digital assets). The rewards to range from free or discount coupons; and may be for in-world or outside-world assets.

The computer system to support virtual non-billboard artifacts where users engage with ad and get reward (virtual currency, content, or music-related digital assets). In this case, artifacts are to be stationary or moving (self-animated or moveable by user). The rewards to range from free or discount coupons; and may be for in-world or outside-world assets.

The computer system to support virtual product placement artifacts where users engage with product and get reward (virtual currency, content, or music-related digital assets). In this case, artifacts are to be stationary or moving (self-animated or moveable by user). The rewards to range from free or discount coupons; and may be for in-world or outside-world assets.

The computer system to support virtual product placement functional features (e.g., transportation) where end-users engage with product (e.g., Lyft, Uber) and get reward (virtual currency, content, or music-related digital assets). The rewards to range from free or discount coupons; and may be for in-world or outside-world assets.

Blockchain Related Aspects

The computer system can support numerous functions related to the use of blockchain technologies, with such functions accruing benefits to one or more of the platforms, the users, content owners and producers, third-parties, and the advertisers. In this regard, the following are contemplated:

The computer system to support the creation of virtual digital music-related merchandise scarcity, including mechanisms for the recordation and trading of such music-related digital assets.

The computer system to support the creation of one or more music-related digital assets (such as mix tapes and analogous music-related digital assets) scarcity, including mechanisms for fostering "breed-able" digital DNA music-related digital assets (such as mix tapes and analogous music-related digital assets)/collaborative with artists who produce music-related digital assets (such as mix tapes and analogous music-related digital assets) that are designated by generation (e.g., the first generation of a mix tape so produced would be a "Gen0" mix tape).

The computer system to support the creation of virtual music-related digital "real estate" scarcity, including mechanisms for implementing blockchain scarcity, recordation, privacy, access controls, personalization spaces for user rooms or other real estate bought, sold, earned, or gifted. Further, the blockchain mechanisms to support economic activities associated with music-related digital real estate tied to artist brands (e.g., split revs with Artist when you buy and build house in "Artist Land").

Browser Related Aspects

The computer system can support numerous functions related to the use of virtual web browsers located throughout the virtual environment music world, with such functions accruing benefits to one or more of the platforms, the users, content owners and producers, third-parties, and the advertisers. In this regard, the following are contemplated:

The computer system to support the creation of in-world virtualized browsers for user consumption of music entertainment content.

The computer system to support the creation of in-world virtualized browsers for user consumption of film and TV entertainment content.

The computer system to support the creation of in-world virtualized browsers for user consumption of news entertainment content.

The computer system to support the creation of in-world virtualized browsers for user consumption of shopping entertainment content.

The computer system to support the creation of in-world virtualized browsers for user consumption of sports entertainment content.

The computer system to support the creation of in-world virtualized browsers for user consumption of educational entertainment content.

The computer system to support the creation of in-world virtualized browsers for user consumption of analogous entertainment and non-entertainment content.

Commerce Related Aspects

The computer system can support numerous commercial activity functions located throughout the virtual environment music world, with such functions accruing benefits to one or more of the platforms, the users, content owners and producers, third-parties, and the advertisers. In this regard, the following are contemplated:

The computer system to support the discovery, interaction, ordering, and/or fulfillment of commercial consumption of digital entertainment and digital non-entertainment goods and services.

The computer system to support the discovery, interaction, ordering, and/or fulfillment of commercial consumption of physical entertainment and physical non-entertainment goods and services.

Communications Related Aspects

The computer system can support numerous functions related to the use of communication technologies, with such functions accruing benefits to one or more of the platforms, the users, content owners and producers, third-parties, and the advertisers. In this regard, the following are contemplated:

The computer system to support the creation of a virtual communication channel that allows messaging of various types (e.g., voice, text, chat, video, photos, emojis) to be originated by a party (e.g., platform operator, user, content owner and producer, third-party, advertiser) within the virtual environment world and be received by one or more parties inside of the virtual environment world (e.g., on-to-one communications, one-to-several communications, one-to-all communications).

The computer system to support the creation of a virtual communication channel that allows messaging of various types (e.g., voice, text, chat, video, photos, emojis) to be originated by a party (e.g., platform operator, user, content owner and producer, third-party, advertiser) within the virtual environment world and be received by one or more parties outside of the virtual environment world (e.g., on-to-one communications, one-to-several communications, one-to-all communications). In this case, the message receipt externally may be a third-party messaging application or a messaging application associated with the platform itself (e.g., a "companion app").

In the case of internal and external messaging, one purpose may be to keep parties informed of virtual environment world happenings (new songs and/or music videos, games, rewards, concerts, etc.) when they are inside or outside of the virtual environment world (inside-out/outside-in functions).

Companion Application Related Aspects

The computer system can support numerous functions related to the use of a non-virtual environment world companion application residing on fixed and mobile devices outside of the virtual environment world system, with such functions accruing benefits to one or more of the platforms, the users, content owners and producers, third-parties, and the advertisers. In this regard, the following are contemplated:

The computer system to support the creation of a companion application that fosters notifications to parties outside of the virtual environment world relating to in-virtual environment world games, rides, stories, concerts, digital merchandise and service offerings, physical merchandise and service offerings, and analogous.

The computer system to support the creation of a companion application that fosters social (e.g., Twitter, Facebook, Pinterest, Instagram) notifications to parties outside of the virtual environment world relating to virtual environment world activities.

The computer system to support the creation of a companion application that fosters a dedicated communication channel between parties outside of the virtual environment world and those inside the virtual environment world, with such communications taking the form of text, chat, voice, photos, videos, emojis, or analogous.

The computer system to support the creation of a companion application that allows parties outside of the virtual environment world to engage fully or partially with aspects inside the virtual environment world and earn points, credits, rewards, or otherwise as if they were engaging from inside the virtual environment world.

Virtual Concert Related Aspects

The computer system can support numerous functions relating to the delivery of live and/or recorded virtual concerts within the virtual environment world system, with such functions accruing benefits to one or more of the platforms, the users, content owners and producers, third-parties, and the advertisers. In this regard, the following are contemplated:

The computer system to support the creation of branded, real-world physical venues for concerts that are either recreated within the virtual environment world as CGI assets, volumetrically scanned, or rendered as a combination thereof.

The computer system to support the creation of branded, previously (i.e., no longer in existence) real-world physical venues for concerts that are either recreated within the virtual environment world as CGI assets, volumetrically scanned, or rendered as a combination thereof.

The computer system to support the creation of branded, non-real-world (fictional) venues for concerts that are either recreated within the virtual environment world as CGI assets, volumetrically scanned, or rendered as a combination thereof.

The computer system to support the creation of fictional or non-fictional virtualized venues for concerts that include a concert experience represented by virtual special effects such as fireworks, light shows, flying objects, and analogous that are generated by the platform administrator of the virtualized venue, a user of the virtualized venue, the users collectively of the virtualized venue, a brand sponsor of the virtualized venue, or a combination thereof.

The computer system to support the creation of fictional or non-fictional virtualized venues for concerts that include a concert experience represented by virtual user expressions such as configurable user dance moves, emotes, object displays (e.g., lighters, glow sticks), and analogous that are generated by the platform administrator of the virtualized venue, a user of the virtualized venue, the users collectively of the virtualized venue, a brand sponsor of the virtualized venue, or a combination thereof.

The computer system to support the creation of fictional or non-fictional virtualized venues for concerts that include a concert experience represented by user avatar participation in the virtual concert such as capturing of user avatar selfies, in-venue virtual flying drone image captures of users, feed of user avatar activities to one or more video screens within the venue (e.g., via fixed position or flying drone crowd cams, and analogous that are generated by the platform administrator of the virtualized venue, a user of the virtualized venue, the users collectively of the virtualized venue, a brand sponsor of the virtualized venue, or a combination thereof Digital Merchandise and Services Related Aspects The computer system can support numerous digital merchandise and services activity functions located throughout the virtual environment music world, with such functions accruing benefits to one or more of the platforms, the users, content owners and producers, third-parties, and the advertisers. In this regard, the following are contemplated:

The computer system to support the discovery, interaction, ordering, and/or fulfillment of commercial consumption of user avatars.

The computer system to support the discovery, interaction, ordering, and/or fulfillment of commercial consumption of music-related digital virtual real estate.

The computer system to support the discovery, interaction, ordering, and/or fulfillment of commercial consumption of user personal space and avatar customization assets.

The computer system to support the discovery, interaction, ordering, and/or fulfillment of commercial consumption of user-controlled music rights where users can accrue prizes, points, tickets, credits, and other items of value when other users in the world engage with a song or music asset that is bound to the account of the music rights owner in the world.

The computer system to support the discovery, interaction, ordering, and/or fulfillment of commercial consumption activities that are recorded and maintained on a blockchain.

The computer system to support the discovery, interaction, ordering, and/or fulfillment of commercial consumption activities that are originated within the virtual music world and delivered physically in the real world (e.g., seeing a digital representation of an object ion the virtual world and ordering its physical analog for delivery to the user in the physical world).

Experience Discovery Related Aspects

The computer system can support numerous virtual environment experience discovery activity functions located throughout the virtual environment music world, with such functions accruing benefits to one or more of the platforms, the users, content owners and producers, third-parties, and the advertisers. In this regard, the following are contemplated:

The computer system to support the creation of a virtual environment music world directory guide, akin to a shopping mall kiosk that you can walk up to and see what else is in the world.

The computer system to support the creation of a "find your favorite artist" feature where a user can stare at a particular non-person character avatar (e.g., the musician Slash) and he will start interacting and talking to you (similar to having Mickey Mouse engage with a visitor at Disneyland). Similarly, a user might engage long enough or in a certain way (e.g., answer trivia) and receive rewards, merchandise, prizes, credits, etc. (rewards to be for in-world or outside-world assets or services). Conversely, if a user engages inappropriately the user will be punished (e.g., take a selfie with him without asking for permission and the user you might have their virtual phone camera smashed by the avatar on the ground).

The computer system to support the creation of a real-world map where a user can place a pin in the real city a user lives so people can see where people are visiting from (social feature).

The computer system to support the discovery of AI based music playlists, artificial intelligence driven virtual DJs, etc.

The computer system to support the creation of a searchable database that markets and sells platform music-related digital assets (e.g., concert tickets, music-related digital assets (such as mix tapes and analogous music-related digital assets), gold records, music-related digital virtual real estate titles, virtual coins, tokens, digital merchandise) and can be seen by other users and enables buying, selling, trading of the same.

Virtual Character Related Aspects

The computer system can support numerous virtual character functions located throughout the virtual environment music world, with such functions accruing benefits to one or more of the platforms, the users, content owners and producers, third-parties, and the advertisers. In this regard, the following are contemplated:

The computer system to support the creation of permanent or continually changing virtual characters that populate the virtual world and interact with real users represented as avatars within the virtual world. The virtual characters may interact in several ways, either through mere presence within the virtual world, the sharing of basic information (e.g., event schedules), and making relevant suggestions or commentary to users based upon those same users' virtual world preferences (e.g., using artificial intelligence or machine learning to interact with a user based upon the user's past virtual world behaviors).

Further, these virtual characters may be influencers of taste within and outside the virtual world, and may have their own virtual apartments, shows, stores, brand endorsements, social media accounts, and analogous within and outside of the virtual world.

Environmental Effects Related Aspects

The computer system can support numerous virtual environmental effect functions located throughout the virtual environment music world, with such functions accruing benefits to one or more of the platforms, the users, content owners and producers, third-parties, and the advertisers. In this regard, the following are contemplated:

The computer system to support the creation of an ever changing and reskinning world assets (sky, buildings, rooms, fireworks, *meteors*, etc.). In this regard, the effects can be determined by the platform administrator of the virtual world, by an individual user (singular) taste, by a collective of users (collective) tastes, by brands, by artists, or by some combination thereof. In addition, the effects may be set to music or not.

Game Related Aspects

The computer system can support numerous virtual environment gaming functions located throughout the virtual environment music world, with such functions accruing benefits to one or more of the platforms, the users, content owners and producers, third-parties, and the advertisers. In this regard, the following are contemplated:

The computer system to support the creation of artist centric or genre/sub-genre centric scavenger hunts games with rewards, where items found are influenced by various aspects (location, skill, chance).

The computer system to support the creation of artist centric or genre/sub-genre centric dance games with rewards.

The computer system to support the creation of role playing games where highest scoring players have status in music industry world, such as Mayor, Tenant, Tourist, etc.

The computer system to support the creation of mix tape competitions (e.g., which music-related digital assets (such as mix tapes and analogous music-related digital assets) are copied the most, played the most, etc.).

The computer system to support the creation of a new music "fight club" room or "March Madness" room for new songs and/or music videos stream counts from publications or public information to determine winners and losers (winner gets a prize).

The computer system to support the creation of virtual passport that gets virtually stamped as you go into different cities/neighborhoods/rooms and that passport can be seen by other users, as well as result in additional benefits or status accruing to the user as the number of stamps in their passport increases.

The computer system to support the creation of tracking and awarding users with the greatest number of re-mixed tapes created.

The computer system to support the creation of simple arcade games like Flappy Bird (type), Corn Hole, Carnival Ball Throw, Shooting Range, Bowling Alley. As an extension, the present disclosure also contemplates having objects thrown or shot are artists, records, guitars, speakers, disco balls, etc.

The computer system to support the creation of wagering type games (traditional or unique).

The computer system to support the creation of Song Guardian type game for both "Masters" and "Limited-editions", where the virtual environment owner of that song gets virtual environment world royalties each time the song is played by others in the world.

The computer system to support the creation of music themed sweepstakes with prizes.

Mix Tape Related Aspects

The computer system can support numerous mix tape creation, publication, sharing, and exchanging functions located throughout the virtual environment music world, with such functions accruing benefits to one or more of the platforms, the users, content owners and producers, third-parties, and the advertisers. In this regard, the following are contemplated:

The computer system to support the creation of music-related digital assets (such as mix tapes and analogous music-related digital assets) exchanges and Walkman type device for playback and social enablement.

The computer system to support the creation of music-related digital assets (such as mix tapes and analogous music-related digital assets) to be placed within the virtual environment world to be found by other users.

The computer system to support the creation of mix tape playback on the user's virtual mobile phone.

The computer system to support the creation of virtual environment world created music-related digital assets (such as mix tapes and analogous music-related digital assets) that are placed within the real physical world as geolocated music-related digital assets to be found by others (user or non-users using a mobile companion application or analogous).

Mobility Related Aspects

The computer system can support numerous mobility functions located throughout the virtual environment music world, with such functions accruing benefits to one or more of the platforms, the users, content owners and producers, third-parties, and the advertisers. In this regard, the following are contemplated:

Branded subway service (e.g., Boring Company) to travel to city, neighborhood, or a room.

Branded taxi service (e.g., Lyft) to travel to city, neighborhood, or a room.

Branded tour bus service (e.g., London Double Decker) to travel to city, neighborhood, or a room.

Mobile Phone UX Command—Teleportation, lateral and horizontal movement, quick search, hot buttons, etc.

Rewards Related Aspects

The computer system can support numerous reward functions located throughout the virtual environment music world, with such functions accruing benefits to one or more of the platforms, the users, content owners and producers, third-parties, and the advertisers. In this regard, the following are contemplated:

The computer system to support users engaging with concert performances and get rewarded (virtual currency, content, music-related digital assets, etc.). In the case of rewards, they may be for in-world or outside-world assets, and can range from free items to discount coupons.

The computer system to support users engaging with designated functional feature (e.g., a new search feature, or new mix feature) and get reward (virtual currency, content, music-related digital assets, etc.). In the case of rewards, they may be for in-world or outside-world assets, and can range from free items to discount coupons.

The computer system to support users engaging with games (scavenger hunt, games, wandering musician or guru who hands out rewards) and get reward (virtual currency, content, music-related digital assets, etc.). In the case of rewards, they may be for in-world or outside-world assets, and can range from free items to discount coupons.

The computer system to support users engaging with rides and get reward (virtual currency, content, music-related digital assets, etc.). In the case of rewards, they may be for in-world or outside-world assets, and can range from free items to discount coupons.

The computer system to support users engaging with any other activity within a designated virtual environment world area and get reward (virtual currency, content, music-related digital assets, etc.). In the case of rewards, they may be for in-world or outside-world assets, and can range from free items to discount coupons.

Virtual Music-Related Real Estate Related Aspects

The computer system can support numerous virtual music-related real estate functions located throughout the virtual environment music world, with such functions accruing benefits to one or more of the platforms, the users, content owners and producers, third-parties, and the advertisers. In this regard, the following are contemplated:

The computer system to support users engaging with virtual music-related real estate that is artist created, managed, or owned.

The computer system to support users that create their own "settlement" (e.g., a house with my music collection) where other users can visit and leave them messages (perhaps connecting your Instagram or FB works here too).

The computer system to support users engaging with virtual music-related real estate that is virtual environment music world operator created, managed, or owned.

Ride Related Aspects

The computer system can support numerous ride functions located throughout the virtual environment music world, with such functions accruing benefits to one or more of the platforms, the users, content owners and producers, third-parties, and the advertisers. In this regard, the following are contemplated:

The computer system to support users engaging "down the rabbit hole" ride experiences where the user experience starts with one song and meta data and it branches to five other songs and/or music videos (linked), that are further linked to another five, etc.

The computer system to support users engaging active ride experiences where user choices at various stages of the ride result in a changing narrative to the ride and the rewards earned (if any).

The computer system to support users engaging passive ride experiences where there are no user choices at various stages of the ride.

The computer system to support having rides "leave" every few minutes where multiple users can go on a particular virtual environment ride experience together (just like ride schedules at Disneyland).

The computer system to support users engaging in non-music thematic rides associated with film, TV artists, or other genres.

The computer system to support users engaging in rides where users are guided through the ride experience by celebrities, taxi drivers, or other analogous type of person or non-person entity.

Room Related Aspects

The computer system can support numerous room functions located throughout the virtual environment music world, with such functions accruing benefits to one or more of the platforms, the users, content owners and producers, third-parties, and the advertisers. In this regard, the following are contemplated:

The computer system to support users engaging with rooms providing thematic content associated with mobile cellular carriers.

The computer system to support users engaging with rooms providing thematic content associated with bars, sports bars, and restaurants.

The computer system to support users engaging with rooms providing thematic content associated with gaming and gambling (and prizes).

The computer system to support users engaging with rooms providing thematic content associated with simple games (and prizes). In this regard, rooms like Flappy Bird (type), Corn Hole, Carnival Ball Throw, Shooting Range, Bowling Alley. As an extension, the present disclosure also contemplates having objects thrown or shot are artists, records, guitars, speakers, disco balls, etc.

The computer system to support users engaging with rooms providing thematic content associated with video game viewership.

The computer system to support users engaging with rooms providing thematic content associated with health and wellness.

The computer system to support users engaging with rooms providing thematic content associated with meditation and mindfulness.

The computer system to support users engaging with rooms providing thematic content associated with museums.

The computer system to support users engaging with rooms providing thematic content associated with non-Sony branded entertainment (e.g., comedy/film/TV).

The computer system to support users engaging with rooms providing thematic content associated with pool halls.

The computer system to support users engaging with rooms providing thematic content associated with record stores.

The computer system to support users engaging with rooms providing thematic content associated with secret rooms (e.g., changing password at the door/solve a riddle/mention a favorite brand to gain access).

The computer system to support users engaging with rooms providing thematic content associated with digital social activities.

The computer system to support users engaging with rooms providing thematic content associated with social responsibility (e.g., Habitat for Humanity, Rock the Vote).

The computer system to support users engaging with rooms providing thematic content associated with Sony branded entertainment (e.g., comedy/film/TV).

The computer system to support users engaging with rooms providing thematic content associated with stem rooms (e.g., listen to songs and/or music videos where you can toggle stems on/off).

The computer system to support users engaging with rooms providing thematic content associated with a talk show with curators discussing non-music content (film, TV, news, sports, fashion, food); and it is contemplated that the experiences might be either live and/or recorded.

The computer system to support users engaging with rooms providing thematic content associated with tattoo parlors.

The computer system to support users engaging with rooms providing thematic content associated with tilt brush types of user generated content.

The computer system to support users engaging with rooms providing thematic content such as museum type digital assets.

The computer system to support users engaging with rooms providing thematic content associated with time capsule rooms/time travel rooms (e.g., user picks a year from the outside, and then on the inside the room transforms to that year in style and the playlist are only songs and/or music videos from that year).

The computer system to support users engaging with rooms providing thematic content associated with trivia rooms. In this regard, the present disclosure envisions having music trivia nights (e.g., each night at 7 PM is a trivia competition with prizes). Possibly expand beyond music in later versions.

The computer system to support users engaging with rooms providing thematic content associated with subjects of personal inspiration.

The computer system to support users engaging with rooms providing thematic content associated with invitation only rooms (e.g., exclusivity for personal rooms or VIPs such as contest winners). Users can monetize their coolness by selling access to their spaces.

The computer system to support users engaging with rooms providing thematic content associated with music artists.

The computer system to support users engaging with rooms providing thematic content associated with DJs who do shows.

The computer system to support users engaging with rooms providing thematic content associated with music genres.

The computer system to support users engaging with rooms providing thematic content associated with karaoke bars with scheduled events (e.g., 8 PM is 80s night).

The computer system to support users engaging with rooms providing thematic content associated with music labels.

The computer system to support users engaging with rooms providing thematic content associated with music sponsors.

The computer system to support users engaging with rooms providing thematic content associated with music discovery (all music), such as discovered through traditional music channels or alternative social or web channels (e.g., Twitter, Wikipedia, YouTube, latest news).

The computer system to support users engaging with rooms providing thematic content associated with music documentaries (all music); including but not limited to talk show style rooms with curators discussing music content (live & recorded) as well as rooms with narration/story telling (e.g., Morgan Freeman voiceover takes you through an artist's history).

The computer system to support users engaging with rooms providing thematic content associated with music education; including but not limited to classrooms for how to play guitar, piano, music theory, history of music, etc. and where such lessons might also be sponsored by generic brand or music instrument brand.

The computer system to support users engaging with rooms providing thematic content associated with music film scores. In this regard, the present disclosure may contemplate experiences based on partial music and partial film content, as well as talk show style rooms with curators discussing music content, and in each case possibly live and/or recorded.

The computer system to support users engaging with rooms providing thematic content associated with music influencers (all music), where such experiences may focus on influences and inspirations from artists about artists and other motivational events. Other aspects may involve a focus on influencers and exploring what draws them to certain types of music.

The computer system to support users engaging with rooms providing thematic content associated with music performance and Billboard type popularity rankings (all music), including data related to new entrants, leaders, laggards, etc.

The computer system to support users engaging with rooms providing thematic content associated with music podcasts (all music), focusing on all stakeholders such as artists, critics, fans, or otherwise.

The computer system to support users engaging with rooms providing thematic content associated with music talk show (all music). This would also extend to talk show style rooms with curators discussing music content, and could be live and/or recorded.

The computer system to support users engaging with rooms providing thematic content associated with a music talk show (a mixture of music and music commentary). An example being music discovery and talk show style rooms with curators playing and discussing music content (e.g., Gimme Radio), and may be live and/or recorded.

Social Related Aspects

The computer system can support numerous social functions located throughout the virtual environment music world, with such functions accruing benefits to one or more of the platforms, the users, content owners and producers, third-parties, and the advertisers. In this regard, the following are contemplated:

The computer system to support users utilizing social mechanics of users buying ads within the virtual environment world to promote their own rooms and user generate content.

The computer system to support users connect social networks like Instagram to their personal real estate spaces and auto populate these rooms with photos, etc. (e.g., have a picture frame on a wall auto load you Instagram photo).

The computer system to support users utilizing social mechanics for peer-to-peer gifting of digital and physical merchandise, services, or currency.

The computer system to support users utilizing social mechanics to ascertain the identity of another user or their space by making an inquiry (e.g., pressing button X).

The computer system to support users utilizing social mechanics to easily import third-party social media data (constantly evolving/refreshed Twitter, Facebook, Instagram, etc. feeds).

The computer system to support users utilizing social mechanics for peer-to-peer mix tape sharing.

The computer system to support users utilizing social mechanics for undertaking social media searches.

The computer system to support users utilizing social mechanics of utilizing traditional social APIs (Twitter/Instagram/Pinterest/FB) to communicate to others within and external to the virtual environment world.

"Song Guardian" Related Aspects

The computer system can support a "Song Guardian" game framework built across the virtual environment music world, with such functions accruing benefits to one or more of the platforms, the users, content owners and producers, third-parties, and the advertisers. In this regard, the following are contemplated.

The computer system to support users participating in a Song Guardian Masters virtual environment game, where a user can claim fictional in-world ownership rights to administer a song or video that plays within the virtual environment world.

In the course of being such a fictional owner, the user will earn digital royalty (e.g., virtual environment royalty) based on each of their song/video's plays within the virtual environment world. Further, users might have to ask the fictional owner for permission to include the song in their mixtape, and the fictional owner can sell or trade an administered song or video for digital currency or another song or video title.

Further, the fictional owner can lose their administration rights to a song or video title based on lack of activity or failure to pay rents on the owned content.

Another feature contemplated is that the fictional owner can claim up to X number of song or video titles to administer, with such ceiling based upon achievement, other user play counts, use of song or video in music-related digital assets (such as mix tapes and analogous music-related digital assets), etc. Alternatively, the fictional owner can claim up to X number of song or video titles to administer, subject to approval by the virtual environment world operator.

Each song or video title will contain a history of origin/provenance and the number of in-world shares that a fictional owner grants determines the acceleration of digital royalties earned and possible extra song and video administration slots.

In terms of distribution, certain upcoming popular songs and/or music videos and videos can be claimed via lottery that may contain extra physical loot.

The fictional owner can search for and connect with others with similar badge achievements.

The computer system to support users participating in a Song Guardian limited-editions virtual environment game, where a user can claim fictional in-world ownership rights to administer a "limited-edition" (rarer) song or video that plays within the virtual environment world.

In the course of being such a limited-edition fictional owner, the user will earn digital royalty (e.g., virtual environment royalty) based on each of their song/video's plays within the virtual environment world. Further, users might have to ask the limited-edition fictional owner for permission to include the song in their mixtape, and the fictional owner can sell or trade an administered song or video for digital currency or another song or video title.

Further, the limited-edition fictional owner can lose their administration rights to a song or video title based on lack of activity or failure to pay rents on the owned content.

Another feature contemplated is that the limited-edition fictional owner can claim up to X number of song or video titles to administer, with such ceiling based upon achievement, other user play counts, use of song or video in music-related digital assets (such as mix tapes and analogous music-related digital assets), etc. Alternatively, the limited-edition fictional owner can claim up to X number of song or video titles to administer, subject to approval by the virtual environment world operator.

Each limited-edition song or video title will contain a history of origin/provenance and the number of in-world shares that a fictional owner grants determines the acceleration of digital royalties earned and possible extra song and video administration slots.

In terms of distribution, certain upcoming popular limited-edition songs and/or music videos and videos can be claimed via lottery that may contain extra physical loot.

The limited-edition fictional owner can search for and connect with others with similar badge achievements.

User Generated Content (UGC) Related Aspects

The computer system can support UGC aspects throughout the virtual environment music world, with such functions accruing benefits to one or more of the platforms, the users, content owners and producers, third-parties, and the advertisers. In this regard, the following are contemplated:

The computer system to support users creating graffiti artwork throughout the world. Places a user's "<username> was here" message on a virtual environment world wall—like people would write their name on the wall of a bathroom. Ability to see other users who visited a room.

The computer system to support users submitting new music to be uploaded and voted on by other users.

The computer system to support users creating their own music via artificial intelligence tools (e.g., such as Amper).

User Voice Command Related Aspects

The computer system can support user voice commands aspects throughout the virtual environment music world, with such functions accruing benefits to one or more of the platforms, the users, content owners and producers, third-parties, and the advertisers. In this regard, the following are contemplated:

The computer system to support the use of user-controlled voice commands to effect commercial transactions within the virtual environment world.

The computer system to support the use of user-controlled voice commands to effect user expressive actions such as performing dance moves, activating in-world special effects, or performing emotive expressions (e.g., likes, clapping, love hearts) within the virtual environment world.

The computer system to support the use of user-controlled voice commands to search for relevant content (e.g., songs and/or music videos, artists, genres, meta data, history, locations, digital merchandise, commerce) within the virtual environment world.

The computer system to support the use of user-controlled voice commands to effect social media interactions and communications within the virtual environment world.

The computer system to support the use of user-controlled voice commands to effect social media searching within the virtual environment world.

The computer system to support the use of user-controlled voice commands to effect transportation (by car, teleportation, portal) within the virtual environment world.

User Rooms Related Aspects

The computer system can support personalized user room aspects throughout the virtual environment music world, with such functions accruing benefits to one or more of the platforms, the users, content owners and producers, third-parties, and the advertisers. In this regard, the following are contemplated:

The computer system to support the use of a personalized user room that can be decorated according to the tastes of the user. Examples of items to be used in the personalization include furniture, pictures, lighting, rugs, wall colors, etc.; whereby some items are free, some are purchased, some are earned.

The computer system to support the use of a personalized user dressing room that can be stocked according to the tastes of the user. Examples of items to be used in the personalization include virtual clothing, wigs, make-up, etc.; whereby some items are free, some are purchased, some are earned.

The computer system to support the use of a user room associated guest book that can be modified/signed by other users visiting the room.

The computer system to support the use of a user room in the creation of music-related digital assets (such as mix tapes and analogous music-related digital assets) by the user controlling such user room.

The computer system to support the use of a user room in the storage and display of awards, badges, and other citations associated with the user controlling such user room.

The computer system to support the use of a user room in the storage and display music-related digital assets owned or controlled by the user controlling such user room.

The computer system to support the use of a user room as a place where the user controlling such user room may upload and display (for themselves and/or others) their own personal audio, photography, art, video files, and analogous user sourced content.

The computer system to support users in socializing with other users and virtual characters in such personal user rooms.

User Status Related Aspects

The computer system can support user status aspects throughout the virtual environment music world, with such functions accruing benefits to one or more of the platforms, the users, content owners and producers, third-parties, and the advertisers. In this regard, the following are contemplated:

The computer system to support user status records memorializing badges that users have earned for engagement with ads. For instance, users that have earn enough badges may be afforded the ability to achieve greater rewards and rights within virtual environment world. Further, users may be able to display badges within user room, or search for and connect with others with similar badge achievements.

The computer system to support user status records memorializing badges that users have earned for playing games, going on rides, attending concerts, etc. For instance, users that have earn enough badges may be afforded the ability to achieve greater rewards and rights within virtual environment world. Further, users may be able to display badges within user room, or search for and connect with others with similar badge achievements.

The computer system to support user status records memorializing badges that users have earned for playing music and watching music videos (this is distinct from the Song Guardian game referenced herein). For instance, users that have earn enough badges may be afforded the ability to achieve greater rewards and rights within virtual environment world. Further, users may be able to display badges within user room, or search for and connect with others with similar badge achievements.

The computer system to support user status records memorializing badges that users have earned for engaging with other users within the world. For instance, users that have earn enough badges may be afforded the ability to achieve greater rewards and rights within virtual environment world. Further, users may be able to display badges within user room, or search for and connect with others with similar badge achievements.

User Expression Related Aspects

The computer system can support numerous functions relating to the enablement of user expression features within the virtual environment world system, with such functions accruing benefits to one or more of the platforms, the users, content owners and producers, third-parties, and the advertisers. In this regard, the following are contemplated:

The computer system to support the creation of fictional or non-fictional virtualized environments (e.g., rooms, streets, concert venues, stores) for user expression that include a user expression capability represented by virtual special effects such as fireworks, light shows, flying objects, and analogous that are generated by the platform administrator of the virtualized environment, a user of the virtualized environment, the users collectively of the virtualized environment, a brand sponsor of the virtualized environment, or a combination thereof.

The computer system to support the creation of fictional or non-fictional virtualized environments (e.g., rooms, streets, concert venues, stores) for user expression that include a user expression capability represented by virtual user expressions such as configurable user dance moves, emotes, object displays (e.g., lighters, glow sticks), and analogous that are generated by the platform administrator of the virtualized environment, a user of the virtualized environment, the users collectively of the virtualized environment, a brand sponsor of the virtualized environment, or a combination thereof.

The computer system to support the creation of fictional or non-fictional virtualized environments (e.g., rooms, streets, concert venues, stores) for user expression that include a user expression capability represented by user avatar participation in the virtual environment such as capturing of user avatar selfies, in-environment virtual flying drone image captures of users, feed of user avatar activities to one or more video screens within the virtual environment (e.g., via fixed position or flying drone crowd cams, and analogous that are generated by the platform administrator of the virtualized environment, a user of the virtualized environment, the users collectively of the virtualized environment, a brand sponsor of the virtualized environment, or a combination thereof.

Video Rooms Related Aspects

The computer system can support video room aspects throughout the virtual environment music world, with such functions accruing benefits to one or more of the platforms, the users, content owners and producers, third-parties, and the advertisers. In this regard, the following are contemplated:

The computer system to support the use of a video room that can be thematically designed to show concerts.

The computer system to support the use of a video room that can be thematically designed to show documentaries.

The computer system to support the use of a video room that can be thematically designed to show educational materials.

The computer system to support the use of a video room that can be thematically designed to show photo streams.

The computer system to support the use of a video room that can be thematically designed to show movies.

The computer system to support the use of a video room that can be thematically designed to show TV shows.

The computer system to support the use of a video room that can be thematically designed to show music story experiences.

The computer system to support the use of a video room that can be thematically designed to show sports and esports content.

Virtual Wallet Related Aspects

The computer system can support virtual wallet aspects throughout the virtual environment music world, with such functions accruing benefits to one or more of the platforms, the users, content owners and producers, third-parties, and the advertisers. In this regard, the following are contemplated:

The computer system to support the use of a virtual wallet that stores and manages music-related digital assets that may be purchased using credit card or in-world virtual currencies.

The computer system to support the use of a virtual wallet that stores and manages a user's rights data for in-world purchases (e.g., tickets for rides, rooms, concerts, digital goods).

The computer system to support the use of a virtual wallet that stores and manages music-related digital assets that are non-consumable in nature, such as badges, digital goods and merchandise represented by actual digital item to be viewed and manipulated within the virtual environment world, and digital goods and merchandise represented by actual digital item that cannot be viewed and manipulated within the virtual environment world (e.g., ownership title).

Miscellaneous Aspects

The computer system can support numerous miscellaneous functions located throughout the virtual environment music world, with such functions accruing benefits to one or more of the platforms, the users, content owners and producers, third-parties, and the advertisers. In this regard, the following are contemplated:

The computer system to support the creation of numerous obvious and secret worm holes or analogous teleportation elements to move throughout the virtual environment world.

The computer system to support the creation of various room popularity rankings, including but not limited to the creation of ranking lists of rooms (what are most popular cities, neighborhoods, rooms, etc.).

The computer system to support the creation of a hi-resolution audio features such as hi resolution and/or immersive audio rooms. Further, in these scenarios there will be the option of creating an audio hardware branding opportunity.

The computer system to support the creation of a spatial audio customization with an ability for platform, artist, user, or other participant to program the audio sound qualities of a particular virtual environment space they control or are experiencing. In this regard, there will also be aspects of control to be derived from one or more of distances of space, ceiling, floor, and walls to a user, interior material types, interior openings, objects and people populating the space.

The computer system to support the creation of a troll rejection tool whereby a user will have the ability to shut off, silence, or otherwise remove another person within the virtual environment world that is bothering a user. Further, these removal actions may be visualized through metaphorical actions (explosion, rocket engines/fireworks, dissolve, melting, etc.).

The computer system to support the creation of a "God like" voice that occasionally gives a user a task or job to do as part of a game or engagement mechanic (e.g., the voice in a Wizard of Oz style or an airport style voice over with public announcement system).

The computer system to support the creation of a "spirit guide" to recommend or instruct the user on engagements. A guide can be human (e.g., musician or historic figure) or non-human form (animal, ghost, floating artwork, etc.), and might be selected by the user when they register with the platform. Some spirit guides may be free, earned, or purchased (music-related digital assets). It is further contemplated that they may be programmatic based upon user's self-created profile and be driven by artificial intelligence or machine learning technology.

The computer system to support the creation of a mobile phone as the user's user experience and in virtual world control center, and mimics the typical apps found on physical real-world mobile phone. In this manner, the mobile phone found in the virtual environment world would have similar value to the mobile phone a user might have in the real world. Such customizable virtual mobile phones to have functions where users may easily swap out phone brands/colors/models (e.g., swapping for free, or for a reward/compensation). Similarly, the virtual mobile phone would have other properties that would mimic other physical world phone elements, such as where the user drops the virtualized phone and the virtualized mobile phone screen breaks. The user would then need to spend in-world virtual currency to fix it.

The computer system to support the creation of a floating chain letter that randomly moves across the virtual environment world—you can grab it and write your name or leave message.

The computer system to support the creation of an in-world friend search feature to assist a user in finding existing and new friends by age/gender/location/playlist characteristic.

The computer system to support the creation of a virtualized geolocation syncing search feature so that a user might find another user's geolocation within the virtual world.

The computer system to support the creation of a graffiti artist feature within the virtual environment music world. User to have the ability of painting on common areas, own room, friends' spaces; and users to use free paints, purchased paints, and earned paints.

The computer system to support the creation of a digital artifact that metaphorically represents music to be consumed by a user, with the ability to collect, arrange, distribute, and consume music that is presenting itself in a physical form not traditionally associated with music (as a food, drink, pill, herb, or analogous). Within these music-related artifacts, meta data and other properties may be embedded that pertains to the virtual environment music world or the elements therein.

FIG. 1 is a flow diagram of a method 100 for adjusting a virtual environment using recommendations in accordance with one implementation of the present disclosure. In the illustrated implementation of FIG. 1, character information is retrieved from a character database, at step 110, where the character information is associated with a character associated with the virtual environment. In one implementation, the character information includes character appearance information, character position information, and character action information. Profile information is then retrieved at step 120, from a profile database, where the profile information indicates one or more profile characteristics and at least one profile characteristic is related to music. At least part of the character information is compared with one or more of the profile characteristics, at step 130, to determine a comparison result. Adjustment information is then generated, at step 140, based on the comparison result. The adjustment information is sent, at step 150, to a client system through a network. An adjustment reply is received, at step 160, from the client system through the network, and information for the virtual environment is adjusted, at step 170, based on the adjustment reply.

In one implementation, the profile information includes an appearance profile characteristic and a music type profile characteristic. In this implementation, character information is compared to profile characteristics including comparing the appearance profile characteristic to character appearance information. The comparison result indicates the music type profile characteristic, and the adjustment information indicates a music recommendation related to music. In one implementation, the appearance profile characteristic indicates clothing. In one implementation, the music recommendation indicates a song. In one implementation, the adjustment reply indicates a confirmation to access the song indicated by the music recommendation.

Figure 2:
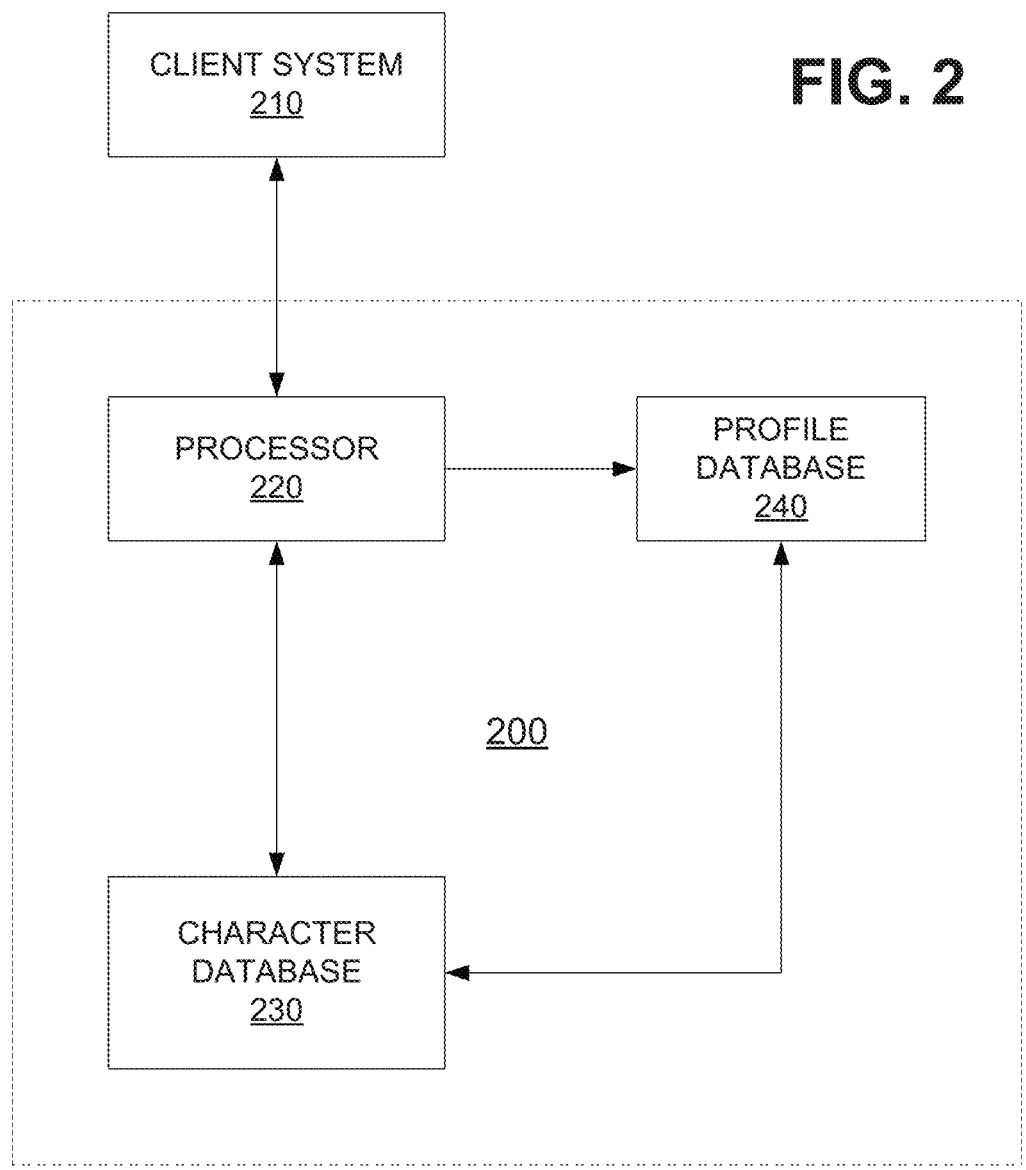
FIG. 2 is a block diagram of a system for adjusting a virtual environment using recommendations in accordance with one implementation of the present disclosure.

FIG. 2 is a block diagram of a system 200 for adjusting a virtual environment using recommendations in accordance with one implementation of the present disclosure. The system 200 includes a processor 220, a character database 230, and a profile database 240.

In one implementation, the processor 220 retrieves character information from the character database 230, where the character information is associated with a character associated with the virtual environment. In one implementation, the character information includes character appearance information, character position information, and character action information. The processor 220 also retrieves profile information from the profile database 240, where the profile information indicates one or more profile characteristics and at least one profile characteristic is related to music. The processor 220 compares at least part of the character information with one or more of the profile characteristics to determine a comparison result. The processor 220 then generates adjustment information based on the comparison result, and is sent to a client system 210 through a network. In one implementation, the processor 220 receives an adjustment reply from the client system 210 through the network, and information for the virtual environment is adjusted based on the adjustment reply.

In one implementation, the system 200 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 200 is configured with a combination of hardware and software.

Further implementation includes: a method of adjusting a virtual environment using profiles, including: retrieving character information from a character database, where the character information is associated with a character associated with the virtual environment, and the character information includes character music information, character appearance information, character position information, and character action information; retrieving profile information from a profile database, where the profile information indicates one or more profile characteristics and at least one profile characteristic is related to music; comparing at least part of the character information with one or more of the profile characteristics to determine a comparison result; generating adjustment information based on the comparison result; and adjusting information for the virtual environment based on the comparison result.

In one implementation, the profile information includes an appearance profile characteristic and a music profile characteristic; comparing character information to profile characteristics includes comparing the music profile characteristic to character music information; the comparison result indicates the appearance profile characteristic; and the adjustment information indicates an appearance adjustment. In one implementation, the appearance profile characteristic indicates clothing. In one implementation, the music profile characteristic indicates a music artist. In one implementation, the character music information indicates one or more music preferences.

Further implementation includes: a method of presenting music popularity information for a virtual environment, including: retrieving object information from an object database, where the object information is associated with one or more objects associated with a virtual environment, and the object information includes object type information and object position information; sending the object information to a client system through a network; retrieving character information from a character database, where the character information is associated with a character associated with the virtual environment, and the character information includes character appearance information, character position information, and character action information; sending the character information to the client system through the network; retrieving music information from a music database, where the music information includes music audio information and music popularity information; updating the character information based on the music popularity information; sending the updated character information to the client system through the network.

In one implementation, the character action information includes one or more of character facial expression information, character motion information, character speech information. In one implementation, the character appearance information includes character clothing information. In one implementation, the method further includes receiving user music information from the client system, and where retrieving music information from a music database includes using the user music information to retrieve the music information.

Further implementation includes: a method of presenting music popularity information for a virtual environment, including: retrieving object information from an object database, where the object information is associated with one or more objects associated with a virtual environment, and the object information includes object type information, object position information, and object music information; sending the object information to a client system through a network; retrieving music information from a music database, where the music information includes music audio information and music popularity information; updating the object information based on the music popularity information; and sending the updated object information to the client system through the network.

In one implementation, the object music information for an object identifies music that can be presented to a character that has a position in the virtual environment within a threshold distance from the object.

Further implementation includes: a method of adjusting music popularity information for a virtual environment, including: retrieving object information from an object database, where the object information is associated with one or more objects associated with a virtual environment, and the object information includes object type information and object position information; sending the object information to a client system through a network; retrieving character information from a character database, where the character information is associated with a character associated with the virtual environment, and the character information includes character appearance information, character position information, and character action information; sending the character information to the client system through the network; retrieving music information from a music database, where the music information includes music audio information and music popularity information; sending the music information to the client system through the network; receiving user action information from client system through the network; and updating the music popularity information based on the user action information.

In one implementation, the user action information includes one or more of user eyeline information, user focus information, user object interaction information, and user movement information. In one implementation, user action information includes user selection information indicating a selection of music. In one implementation, the user action information includes user search information indicating a search query for music. In one implementation, the user action information includes user sharing information indicating a request to share a selection of music. In one implementation, the method further includes sending the updated music popularity information to a music service server through the network. In one implementation, the method further includes: receiving music service information from a music service server through the network; and updating the music popularity information based on the music service information.

Further implementation includes: a method of providing music information for a virtual environment, including: receiving a music selection in a virtual environment app executing on a mobile device, where the virtual environment app is associated with a virtual environment provided by a server; sending the music selection to the server through a network; receiving music information from the server through the network, where the music information includes music audio information; receiving an audio device selection in the virtual environment app, where the audio device selection indicates an audio device connected to the mobile device through a local network; and sending the music information to the audio device through the local network.

Further implementations include recommendations from the system, such as through the system's non-player virtual character avatars, to real-life users of the system where:

The virtualized environment system observes:
- a) User's virtualized personal appearance (current and historic), such as related to clothing, body type, gender, tattoos, jewelry, hairstyle, or other identifying or expressive feature;
- b) User's virtualized personal room or home location within a virtual world (current and historic); such as being located within building "x" or house "y";
- c) User's virtualized personal room or home appearance (current and historic), such as relating to artwork, lighting, floor type, wall coloring, furniture type, and/or other functional objects (TVs, radios, communication devices);
- d) User's virtualized personal room or home visitors (current and historic);
- e) User's virtualized network of friends within the virtualized world, and the level and type of engagement such user has with their network of friends;
- f) User's taste and preferences relating to virtualized entertainment content (songs, concerts, films, television shows, museum displays), including but not limited to types of audio, imagery, and/or video sought out, collected, and consumed;
- g) User's taste and preferences relating to the types of virtualized digital merchandise the user seeks out, collects, earns, purchases, and uses;
- h) User's taste and preferences relating to the types of real-world physical merchandise the user seeks out, collects, earns, and purchases for delivery to such user in the real-world; and
- i) User's taste and preferences relating to the types of in-world virtualized games and activities the user seeks out, plays, and interacts with.

And thereafter the virtualized environment system recommends to the user one or more of the following:
- a) System to automatically recommend to the user in the virtualized environment how to adjust or optimize their virtualized appearance as a virtualized avatar, such as related to clothing, body type, gender, tattoos, jewelry, or other identifying or expressive feature;
- b) System to automatically recommend to the user in the virtualized environment how to adjust or optimize the virtual location of any virtualized personal room, store, venue, or home location within the virtual world; such as being located within building "x" or house "y", or moving a virtualized structure from street "a" to street "b";
- c) System to automatically recommend to the user in the virtualized environment how to adjust or optimize the virtualized appearance of any in-world virtualized personal room, store, venue, or home location within the virtual world, such as relating to artwork, lighting, floor type, wall coloring, furniture type, and/or other functional objects (TVs, radios, communication devices);
- d) System to automatically recommend to the user in the virtualized environment how to adjust or optimize the user's network of friends within the virtualized world and how they may engage with one another;
- e) System to automatically recommend to the user in the virtualized environment how to adjust or optimize their access and incentives relating to virtualized entertainment content (songs, concerts, films, television shows, museum displays), including but not limited to types of audio, imagery, and/or video sought out, collected, and consumed;
- f) System to automatically recommend to the user in the virtualized environment how to adjust or optimize their access and incentives relating to virtualized digital merchandise the user seeks out, collects, earns, purchases, and uses;
- g) System to automatically recommend to the user in the virtualized environment how to adjust or optimize their access and incentives relating to the types of real-world physical merchandise the user seeks out, collects, earns, and purchases for delivery to such user in the real-world; and
- h) System to automatically recommend to the user in the virtualized environment how to adjust or optimize their access and incentives relating to the types of in-world virtualized games and activities the user seeks out, plays, and interacts with.

Further implementations include the ability of virtual environment to automatically change based upon observed virtualized tastes, behaviors, and related characteristic of the real-life users of the system. The virtualized environment system observes:
- a) User's virtualized personal appearance (current and historic), such as related to clothing, body type, gender, tattoos, jewelry, or other identifying or expressive feature;
- b) User's virtualized personal room or home location within a virtual world (current and historic); such as being located within building "x" or house "y";
- c) User's virtualized personal room or home appearance (current and historic), such as relating to artwork, lighting, floor type, wall coloring, furniture type, and/or other functional objects (TVs, radios, communication devices);
- d) User's virtualized personal room or home visitors (current and historic);
- e) User's virtualized network of friends within the virtualized world, and the level and type of engagement such user has with their network of friends;
- f) User's taste and preferences relating to virtualized entertainment content (songs, concerts, films, television shows, museum displays), including but not limited to types of audio, imagery, and/or video sought out, collected, and consumed;
- g) User's taste and preferences relating to the types of virtualized digital merchandise the user seeks out, collects, earns, purchases, and uses;
- h) User's taste and preferences relating to the types of real-world physical merchandise the user seeks out, collects, earns, and purchases for delivery to such user in the real-world; and
- i) User's taste and preferences relating to the types of in-world virtualized games and activities the user seeks out, plays, and interacts with.

And thereafter the virtualized environment system responds in one or more of the following ways:
- a) System to automatically reconfigure the virtualized appearance of any in-world non-player character virtualized avatar, such as related to clothing, body type, gender, tattoos, jewelry, or other identifying or expressive feature;

b) System to automatically reconfigure the virtual location of any virtualized personal room, store, venue, or home location within the virtual world; such as being located within building "x" or house "y", or moving a virtualized structure from street "a" to street "b";
c) System to automatically reconfigure the virtualized appearance of any in-world virtualized personal room, store, venue, or home location within the virtual world, such as relating to artwork, lighting, floor type, wall coloring, furniture type, and/or other functional objects (TVs, radios, communication devices);
d) System to automatically reconfigure which non-player characters visit a virtualized personal room or home;
e) System to automatically reconfigure how a user's virtualized network of friends within the virtualized world may engage with one another;
f) System to automatically reconfigure the user's access and incentives relating to virtualized entertainment content (songs, concerts, films, television shows, museum displays), including but not limited to types of audio, imagery, and/or video sought out, collected, and consumed;
g) System to automatically reconfigure the user's access and incentives relating to of virtualized digital merchandise the user seeks out, collects, earns, purchases, and uses; and
h) System to automatically reconfigure the user's access and incentives relating to the types of real-world physical merchandise the user seeks out, collects, earns, and purchases for delivery to such user in the real-world.

System to automatically reconfigure the user's access and incentives relating to the types of in-world virtualized games and activities the user seeks out, plays, and interacts with.

Figure 3A:
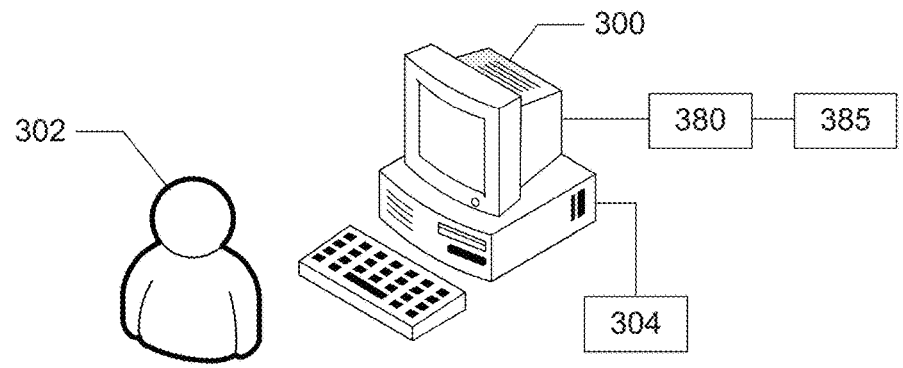
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a music-themed virtual world management application 390 as illustrated and described with respect to the method 100 and the system 200 in FIGS. 1 and 2.

Figure 3B:
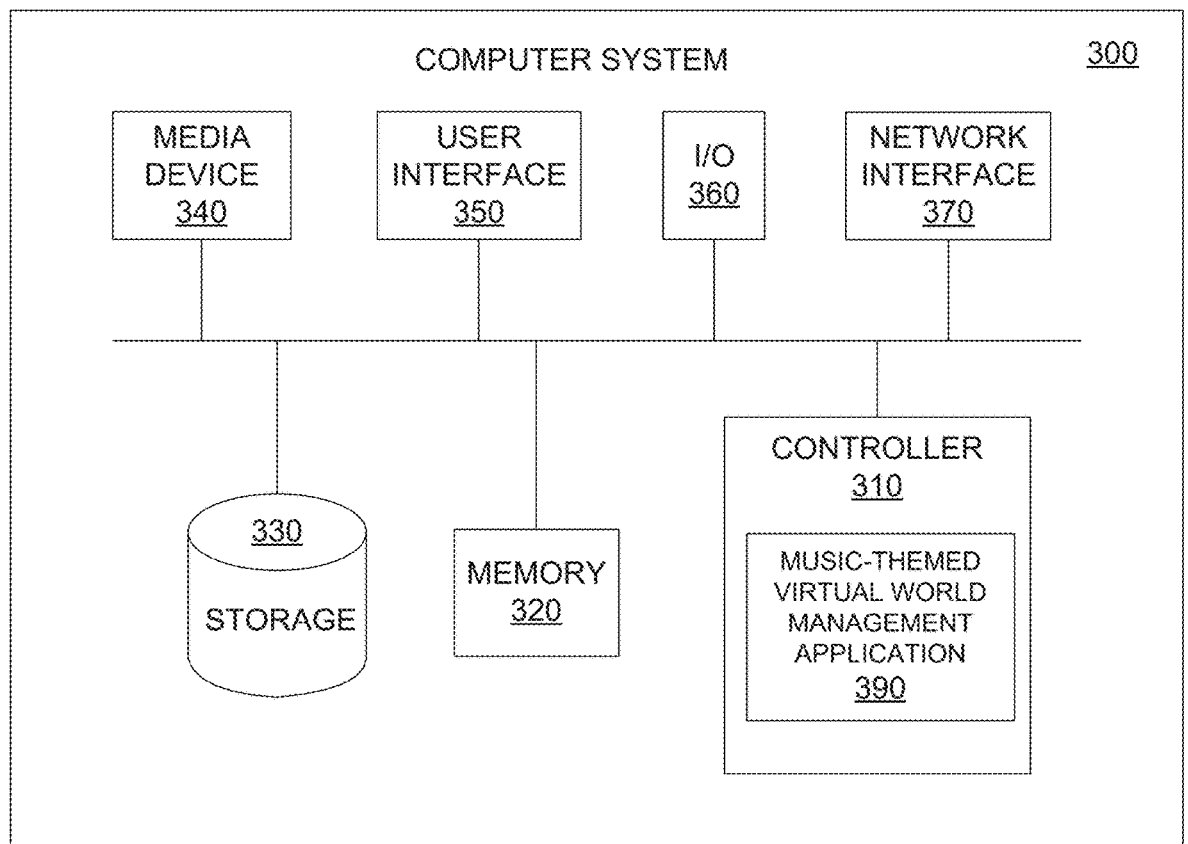
FIG. 3B is a functional block diagram illustrating the computer system hosting the digital content access management application in accordance with an implementation of the present disclosure.

The computer system 300 stores and executes the music-themed virtual world management application management application 390 of FIG. 3B. In addition, the computer system 300 may be in communication with a software program 304. Software program 304 may include the software code for the music-themed virtual world management application management application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the music-themed virtual world management application management application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the music-themed virtual world management application management application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the music-themed virtual world management application management application 390 with a software system, such as to enable the creation and configuration of engines and data extractors within the music-themed virtual world management application management application 390. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the music-themed virtual world management application management application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

Figure 4:
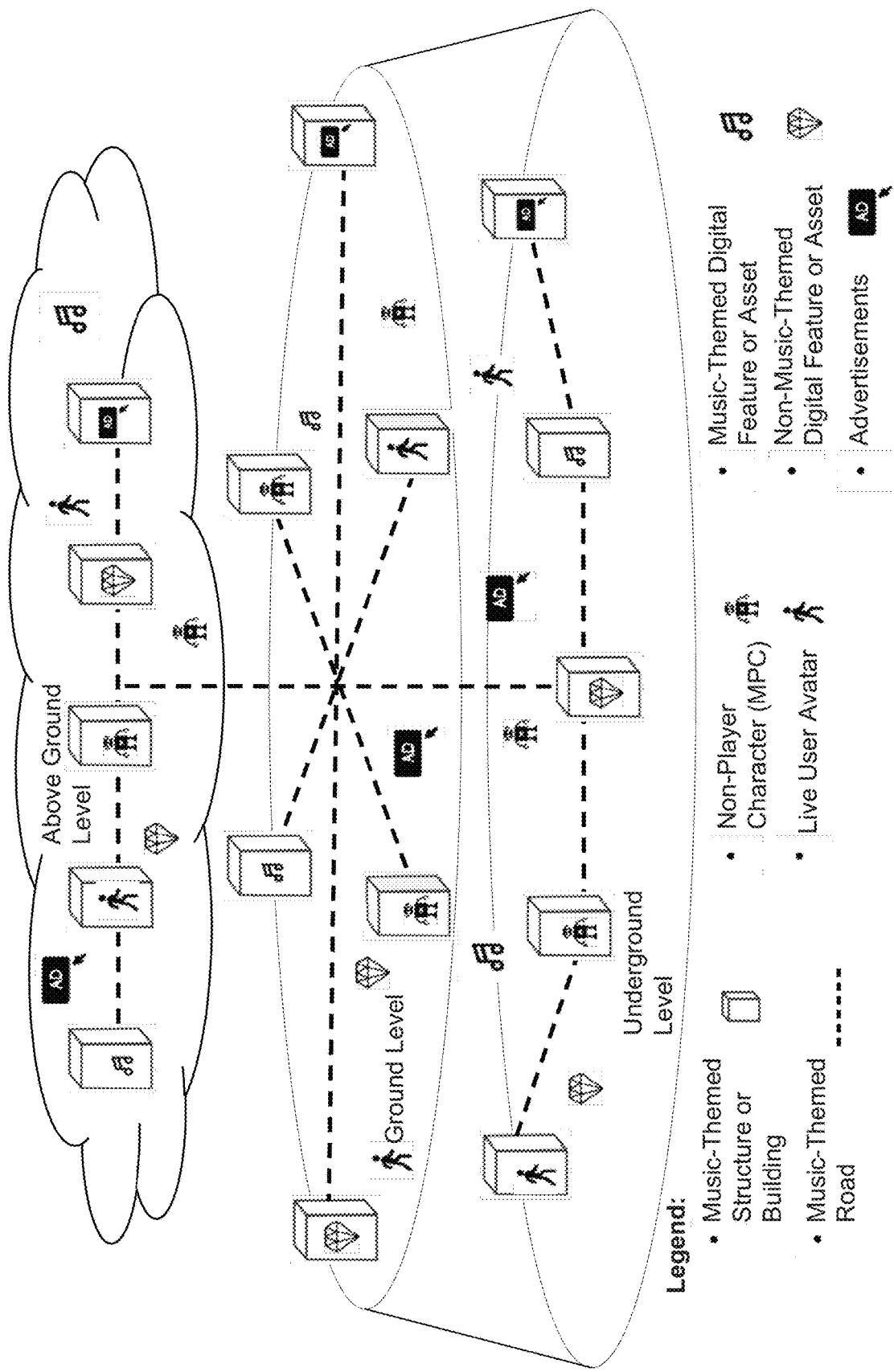
FIG. 4 shows an example of a map of a virtual music world.

FIG. 4 shows an example of a map of a virtual music world in accordance with one implementation of the present disclosure. In the illustrated implementation of FIG. 4, there are three levels including the underground level, the ground level, and the above ground level. Each level includes music-themed structures, music-themed roads, music-themed digital features or assets, and non-music-themed digital features or assets. Each level also includes advertisements, non-player characters, and live user avatars.

While the music-themed virtual environment can take any form (based on real-world places, fantasy place, combinations of both), a simple representation of the virtual environment can be found in FIG. 4. FIG. 4 shows that the virtual environment can be three dimensional, with user explorable spaces that are ground level, sub-ground level, and above ground level. Within this construct, the user may navigate freely or on a permissioned basis, and encounter various music- and non-music-themed elements. In one implementation, the elements may be actual or metaphorical in nature, and may manifest as buildings and structures, as wells road and non-road thoroughfares. Further, the virtual environment may be occupied by real-human users (in the form of in-world avatars) as well as robotic non-player character avatars possessing artificial intelligence or scripts that dictate their behaviors within the world. Lastly, any assortment of music-themed and non-music-themed objects and items (representing physical items, sounds, and/or sights) may be present within the virtual environment and exist for the sole or combined purpose of user observation, interaction, collection, consumption, or otherwise. Examples of objects and items might be album covers, full songs, posters, digital merchandise clothing, potions, badges, jewels, coins, or otherwise.

Figure 5:
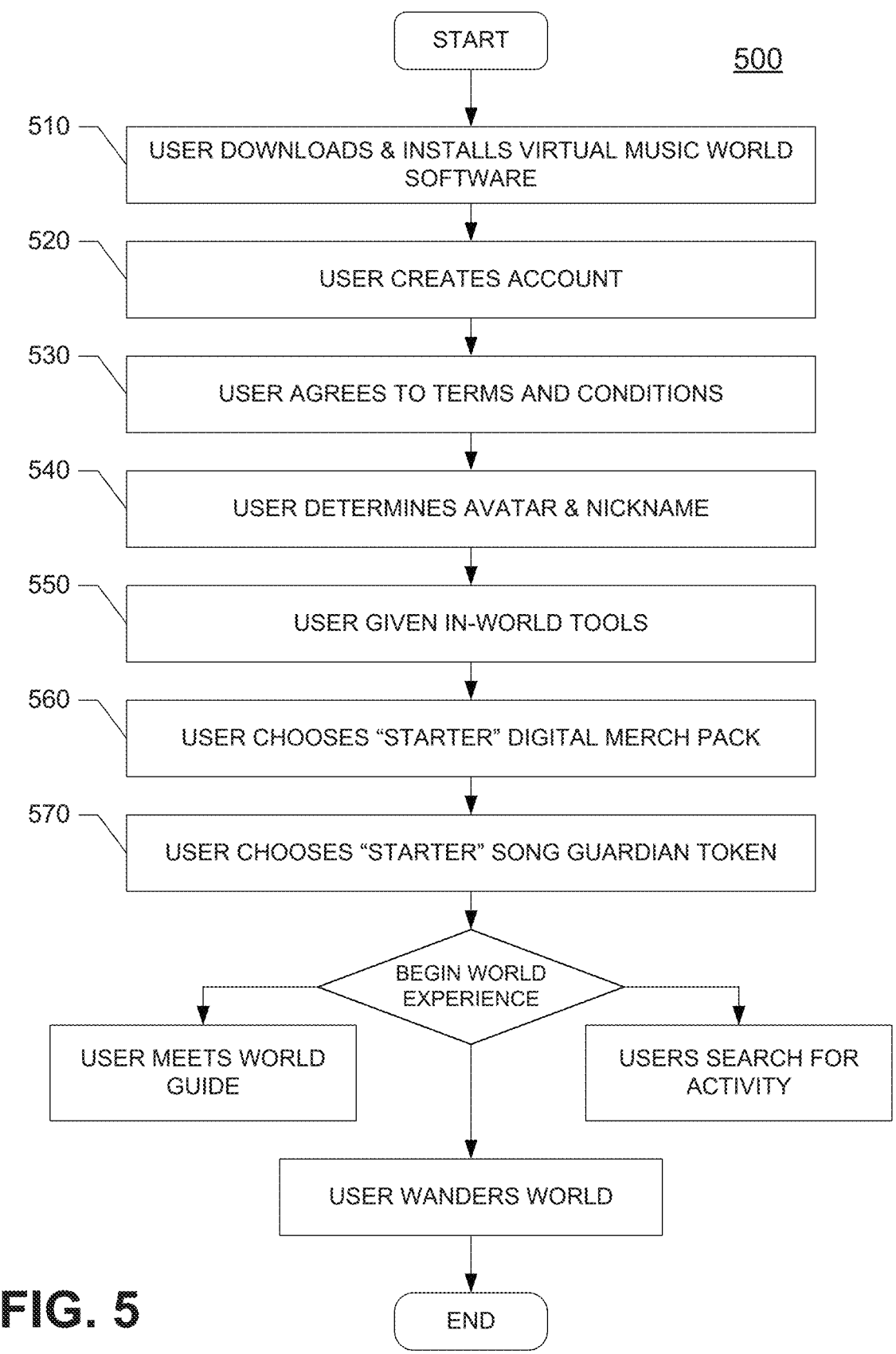
FIG. 5 shows an overview of steps in a user experience with a virtual music world in one implementation.

FIG. 5 is a flow diagram of a method 500 of a user experience with a virtual music world in accordance with one implementation of the present disclosure. Initially, the user downloads and installs, at step 510, the virtual music world software. In step 510, the creation of an interactive, ever-expanding virtual environment ("computer system") to be predominantly music themed where users may immersively experience all types of music through the use of a virtual environment device (e.g., a computer, game console, virtual reality headset, mobile phone, augment reality device) that can convey audio, visual, and haptic music experiences to one or more virtual environment world users. In the course of such virtual environment engagement, the users may interact with other users in a social manner, communicating with through text, chat, voice, visual, or analogous mediums. The users may also engage with others who are not concurrently present within the virtual environment world by leaving them messages in various forms, or by sending messages to others outside the virtual environment world completely (e.g., text message from within the virtual environment world to a text recipient outside the virtual environment world on a physical world phone). Further, the immersive nature of the virtual environment world will enable non-music types of interactions that are complementary to music engagement, including, but not limited to brand engagements, consumer purchase engagements for digital and/or physical merchandise (standard issue, user-generated, customizable, or otherwise), video games, scavenger hunts, rides, games of chance, games of skill, virtual concerts, story-telling experiences, virtual movies, virtual TV shows, virtual sport events, virtual esports events, ownership, customization, and use of virtual property, educational experiences, meditation, health, and mindfulness experiences, and analogous. To better support these types of diverse activities, the virtual environment world will employ a virtual and non-virtual currency system to promote economic interactions between the users and each other, the platform operators themselves, as well as non-user participants in the platform. Similarly, the system will support users in their various engagements by having various forms of informational prompts throughout, where users may be intelligently guided on the features of the system as they pertain to those users tastes and needs specifically (personalized guidance), and in some cases the informational prompts may take the form of artificial intelligence avatars (non-person characters) that present themselves to users a in world characters to be interacted with.

The user creates an account, at step 520, and agrees to the terms and conditions, at step 530. The user then determines an avatar and a nickname, at step 540, and is given in-world tools, at step 550. In step 550, various in-world virtual tools (e.g., Walkman, headphones, mobile phone, wallet) are introduced immediately to convey: (a) how music is listened to; {b} how to share info/photos; (c) how to navigate virtual world (maps); (d) how to communicate with others; (e) how to search world (music, rooms, events, people, rewards); (f) where your wallet resides; (g) what is in your wallet (coins, brand loyalty points, brand punch cards, photos, licenses, etc.).

The user chooses a Starter Digital Merchandise (Merch) Pack, at step 560. In step 560, the Starter Digital Merch Pack (e.g., simple clothing, furniture, music collectibles, emotes) immediately introduces the Digital Merch value proposition and lays the foundation for user ongoing investment justification (driving user through various monetization funnels). Music-themed proposition aspects to convey that Monterey is a music world that: (a) builds upon "real world" assets that are thematically related to music; (b) prioritizes user musical choice and taste; (c) empowers the user to own and/or control scarce music assets and experiences; (d) functions intuitively via traditional game play mechanics; and (e) is "free to play" and inviting to all.

The user chooses a Starter Song Guardian Song or Song Token, at step 570. In step 570, the Starter Song Guardian Song or Song Token (e.g., the token not tied to a song specifically, but instead redeemable in Son Guardian area of virtual world) immediately introduces the Song Guardian value proposition and lays the foundation for user ongoing investment justification (driving user through various monetization funnels). Music-themed value proposition aspects to convey that Monterey is a music world that: (a) builds upon "real world" songs; (b) prioritizes user musical choice and taste; (c) empowers the user to own and control scarce music as sets and experiences; (d) functions intuitively via traditional game play mechanics; and (e) is "free to play" and inviting to all.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, variations to the virtual environment include augmented reality (AR) environments, online environments (MMO, social networks, etc.), and mobile companions to AR/virtual environments. Variations to the content include contents other than songs (e.g., video, images, digital object collections, and mixed types). Other variations include editing of objects in collections (e.g., changing, combining, original content) and uniqueness restrictions, scarcity. Thus, the present disclosure is not intended to be limited to the implementations shown herein but is to be accorded the widest scope consistent with the principal and novel features disclosed herein.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method of adjusting a music-themed virtual environment using recommendations, the method comprising:
    retrieving character information from a character database, where the character information is associated with a character associated with the virtual environment, and the character information includes character appearance information, character position information, and character action information;
    retrieving profile information from a profile database, where the profile information indicates one or more profile characteristics and at least one profile characteristic is related to music,
    wherein the profile information includes an appearance profile characteristic and a music type profile characteristic;
    comparing at least part of the character information with the one or more of the profile characteristics to determine a comparison result, including comparing the appearance profile characteristic to the character appearance information,
    wherein the appearance profile characteristic relates to one of clothing, body type, gender, tattoos, jewelry, or other identifying or expressive feature;
    generating adjustment information based on the comparison result, which indicates the music type profile characteristic;
    sending the adjustment information to a client system through a network,
    wherein the adjustment information indicates a music recommendation adjusted to the comparison result of the appearance profile characteristic;
    receiving an adjustment reply from the client system through the network; and
    adjusting information for the virtual environment based on the adjustment reply, which indicates a confirmation to access the song indicated by the music recommendation,
    wherein the music recommendation comes from a system of the music-themed virtual environment through non-player virtual character avatars;
    in response to adjusting the information, adjusting the virtual environment using the adjusted information.

2. The method of claim 1, where:
    the music recommendation indicates a song.

3. A method of adjusting a virtual environment using profiles, comprising:
    retrieving character information from a character database, where the character information is associated with a character associated with the virtual environment, and the character information includes character music information, character appearance information, character position information, and character action information;
    retrieving profile information from a profile database, where the profile information indicates one or more profile characteristics and at least one profile characteristic is related to music,
    wherein the profile information includes an appearance profile characteristic and a music type profile characteristic;
    comparing at least part of the character information with one or more of the profile characteristics to determine a comparison result, including comparing the appearance profile characteristic to the character appearance information,
    wherein the appearance profile characteristic relates to one of clothing, body type, gender, tattoos, jewelry, or other identifying or expressive feature;
    generating adjustment information based on the comparison result, which indicates the music type profile characteristic; and
    adjusting information for the virtual environment based on the comparison result, which indicates a confirmation to access the song indicated by a music recommendation adjusted to the comparison result of the appearance profile characteristic,
    wherein the music recommendation comes from a system of the music-themed virtual environment through non-player virtual character avatars;
    in response to adjusting the information, adjusting the virtual environment using the adjusted information.

4. The method of claim 3, where:
    the music profile characteristic indicates a music artist.

5. The method of claim 3, where:
    the character music information indicates one or more music preferences.

6. A method of presenting music popularity information for a virtual environment managed by a server system, comprising:
    retrieving object information from an object database, where the object information is associated with one or more objects associated with the virtual environment, and the object information includes object type information and object position information;
    sending the object information to a client system through a network;
    retrieving character information from a character database, where the character information is associated with a character associated with the virtual environment, and the character information includes character appearance information, character position information, and character action information,
    wherein the character action information includes one or more of character facial expression information, character motion information, character speech information,
    wherein the character appearance information includes information relating to one of clothing, body type, gender, tattoos, jewelry, or other identifying or expressive feature;
    automatically configuring the virtualized appearance of non-player virtual character avatars of the virtual environment based on the character appearance information;
    sending the character information to the client system through the network;
    retrieving music information from a music database, where the music information includes music audio information and music popularity information;
    updating the character information based on the music popularity information;
    sending the updated character information to the client system through the network.

7. The method of claim 6, further comprising receiving user music information from the client system, and where retrieving music information from a music database includes using the user music information to retrieve the music information.

8. A method of adjusting music popularity information for a virtual environment managed by a server system, comprising:

retrieving object information from an object database, where the object information is associated with one or more objects associated with the virtual environment, and the object information includes object type information and object position information;

sending the object information to a client system through a network;

retrieving character information from a character database, where the character information is associated with a character associated with the virtual environment, and the character information includes character appearance information, character position information, and character action information, wherein the character appearance information includes information relating to one of clothing, body type, gender, tattoos, jewelry, or other identifying or expressive feature, and wherein the character appearance information enables the server system to automatically configure virtualized appearance of non-player virtual character avatars of the virtual environment;

sending the character information to the client system through the network;

retrieving music information from a music database, where the music information includes music audio information and music popularity information;

sending the music information to the client system through the network;

receiving user action information from client system through the network, wherein the user action information includes at least one of:

one or more of user eyeline information, user focus information, user object interaction information, and user movement information;

user selection information indicating a selection of music;

user search information indicating a search query for music; and user sharing information indicating a request to share a selection of music;

updating the music popularity information based on the user action information.

9. The method of claim 8, further comprising sending the updated music popularity information to a music service server through the network.

10. The method of claim 8, further comprising:

receiving music service information from a music service server through the network;

updating the music popularity information based on the music service information.

* * * * *